(12) United States Patent
Gaither

(10) Patent No.: US 10,814,860 B1
(45) Date of Patent: Oct. 27, 2020

(54) LIMITING ENGINE ON CONDITION WHILE COASTING

(71) Applicant: TOYOTA MOTOR ENGINEERING & MANUFACTURING NORTH AMERICA, INC., Plano, TX (US)

(72) Inventor: Geoffrey D. Gaither, Brighton, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/396,510

(22) Filed: Apr. 26, 2019

(51) Int. Cl.
| | |
|---|---|
| *B60W 20/11* | (2016.01) |
| *B60K 28/10* | (2006.01) |
| *B60W 20/40* | (2016.01) |
| *B60K 23/08* | (2006.01) |
| *B60W 30/18* | (2012.01) |
| *B60K 28/00* | (2006.01) |

(52) U.S. Cl.
CPC ............ *B60W 20/11* (2016.01); *B60K 28/10* (2013.01); *B60W 20/40* (2013.01); *B60K 2023/0858* (2013.01); *B60K 2028/006* (2013.01); *B60W 30/18072* (2013.01); *B60W 2552/15* (2020.02)

(58) Field of Classification Search
CPC .. B60W 20/11; B60W 20/40; B60W 2552/15; B60W 30/18072; B60K 28/10; B60K 2028/006; B60K 2023/0858
See application file for complete search history.

(56) References Cited

U.S. PATENT DOCUMENTS

| | | | |
|---|---|---|---|
| 6,364,434 B1 | 4/2002 | Sway-Tin | |
| 9,561,719 B2 | 2/2017 | Lo | |
| 2013/0048395 A1* | 2/2013 | Kobayashi | B60W 20/40 180/65.265 |
| 2013/0116087 A1* | 5/2013 | Ichikawa | B60W 30/18118 477/79 |
| 2013/0261866 A1* | 10/2013 | Hoshiba | B60W 20/15 701/22 |
| 2013/0296119 A1* | 11/2013 | Reed | F02P 5/1508 477/5 |
| 2013/0296126 A1* | 11/2013 | Gibson | B60K 6/30 477/5 |
| 2013/0296136 A1* | 11/2013 | Doering | B60W 10/02 477/167 |
| 2013/0297161 A1* | 11/2013 | Gibson | B60L 15/2018 701/54 |
| 2013/0297191 A1* | 11/2013 | Gibson | B60W 10/06 701/112 |
| 2017/0113677 A1* | 4/2017 | Endo | B60W 10/08 |
| 2018/0222308 A1* | 8/2018 | Imamura | B60W 20/00 |
| 2018/0222483 A1 | 8/2018 | Yoon | |
| 2019/0039600 A1 | 2/2019 | Hawley | |

* cited by examiner

*Primary Examiner* — Erez Gurari
(74) *Attorney, Agent, or Firm* — Sheppard, Mullin, Richter & Hampton LLP; Hector A. Agdeppa; Daniel N. Yannuzzi

(57) ABSTRACT

Systems and methods are provided that prevent or override a hybrid electric vehicle (HEV) from operating in an engine-on mode or condition when the HEV is coasting, such as when the HEV is traveling on a downhill grade. Regenerative torque is generated by one or more electric motors of the HEV so that the pinion gear of a planetary gear set of a power distribution mechanism operates below an overspeed limit at which hardware failure may occur.

12 Claims, 9 Drawing Sheets

LIMITING ENGINE ON CONDITION WHILE COASTING

TECHNICAL FIELD

The present disclosure relates generally to controlling drive power in a hybrid electric vehicle (HEV). In some embodiments, actions can be performed in order to counteract excessive pinion gear speed (or pinion overspeed) in the planetary gear set of the HEV, which can be reflected by way of or indicated as a maximum engine-on vehicle (EOV) speed.

DESCRIPTION OF RELATED ART

HEVs have become increasingly popular among consumers concerned with their environmental impact and with increasing fuel economy. HEVs generally utilize an engine, e.g., an internal combustion engine (ICE), along with one or more electric motors, which can also operate as a generator(s) to provide energy to a battery that powers the electric motor(s). The drivetrain of an HEV can include the engine, the one or more electric motors, and an automatic transmission coupled to the engine and the one or more electric motors for transmitting power from the engine, electric motor(s), or a combination thereof.

Each HEV or model/make of HEV may have a determined pinion gear speed or maximum EOV speed. This pinion gear speed or maximum EOV speed can refer to the speed at which the pinion gear rotates or the corresponding vehicle speed which when met or exceeded, causes the HEV to turn on its engine (engine-on condition). The HEV's engine is enabled, generally, in order to prevent bearing failure and/or gear teeth penetration. Thus, in certain situations, such as when the HEV is coasting while traveling on a downgrade, the HEV's engine may start even if the HEV operator does not input or make a request to start the engine. This can negatively impact fuel economy as well as recouping regenerative energy.

BRIEF SUMMARY OF THE DISCLOSURE

In accordance with one embodiment, a method comprises determining a hybrid electric vehicle (HEV) is experiencing a coast condition, and setting an initial amount of regenerative torque to be generated by a motor of the HEV. The method may further comprise determining whether a pinion gear of the HEV is approaching a pinion gear overspeed limit. In response to a determination that the pinion gear of the HEV is not approaching the pinion gear overspeed limit, the initial amount of regenerative torque is generated and the initial regenerative torque amount is applied to drive the HEV while maintaining the HEV in an engine-off condition.

In some embodiments, the HEV is experiencing a coasting condition while traversing a downhill grade.

In some embodiments, the method further comprises calculating a state of charge of a battery powering the HEV required to complete traversal of the downhill grade.

In some embodiments, the method further comprises determining if charge power of the battery can be increased while maintaining the HEV in an engine-off condition, and if so, increasing a charge power limit of the battery to accommodate regenerated energy produced by application of the initial amount of regenerative torque.

In some embodiments, the method further comprises determining if a state of charge limit of the battery can be increased while maintaining the HEV in an engine-off condition, and if so, increasing the state of charge limit to accommodate the regenerated energy produced by application of the initial amount of regenerative torque.

In response to a determination that the pinion gear of the HEV is approaching the pinion gear overspeed limit, the method may further comprise determining whether the initial amount of regenerative torque is approaching a regenerative torque threshold.

In response to a determination that the initial amount of regenerative torque is not approaching the regenerative torque threshold, the method may further comprise generating an additional amount of regenerative torque and applying the additional amount of regenerative torque to drive the HEV while maintaining the HEV in an engine-off condition.

In response to a determination that the initial amount of regenerative torque is approaching the regenerative torque threshold, the method may further comprise determining whether the battery charge limit has reached a maximum level.

In response to determining that the battery has not reached the maximum level, the method may further comprise temporarily increasing the charge limit above the maximum level but below an absolute maximum level.

In response to determining that the battery has reached the maximum level, the method may further comprise operating an engine of the HEV in a fuel cut off condition.

In some embodiments, the method may further comprise engaging friction bakes of the HEV.

In some embodiments, the method may further comprise continuing application of the initial amount of regenerative torque until operating conditions of the HEV necessitate an engine-on condition, and instructing the engine of the HEV to turn on.

In accordance with another embodiment, a hybrid electric vehicle (HEV), may comprise a power transmission path. The power transmission path may include an internal combustion engine, and at least one electric motor operatively to the internal combustion engine. The power transmission path may further include: a power distribution mechanism generating drive power from the internal combustion engine, the at least one electric motor, or a combination thereof via operation of a planetary gear set including a pinion gear; and an electronic control unit (ECU) adapted to adjust regenerative torque generated by the at least one electric motor to prevent the internal combustion engine from generating drive power while the HEV is coasting on a downhill grade.

In some embodiments, the ECU sets an initial amount of regenerative torque based on current HEV operation conditions and road conditions including a state of charge (SOC) of a battery powering the at least one electric motor, a vehicle speed of the HEV, temperature of the battery, temperature of the at least one electric motor, and road grade.

In some embodiments, the ECU increases a charge power limit of a battery powering the at least one electric motor as long as the HEV can continue being operated without the internal combustion engine generating drive power, the increased charge power allowing the battery to recoup energy generated by the initial amount of the regenerative torque.

In some embodiments, the ECU increases an SOC of the battery as long as the HEV can continue being operated without the internal combustion engine generating drive power, the increased SOC allowing the battery to recoup the energy generated by the initial amount of the regenerative torque.

In some embodiments, the ECU determines a current speed at which the pinion gear is rotating.

In some embodiments, the ECU instructs the at least one electric motor to generate additional regenerative torque, wherein energy resulting from the additional regenerative torque is recouped by the battery whose charge limit is temporarily increased.

In some embodiments, the energy resulting from the additional regenerative torque is recouped by the battery whose SOC limit is temporarily increased.

In some embodiments, the ECU turns the internal combustion engine on when operating conditions of the HEV and road conditions do not allow for the generation of regenerative torque in an amount sufficient to prevent the internal combustion engine from generating drive power while the HEV is coasting on a downhill grade.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
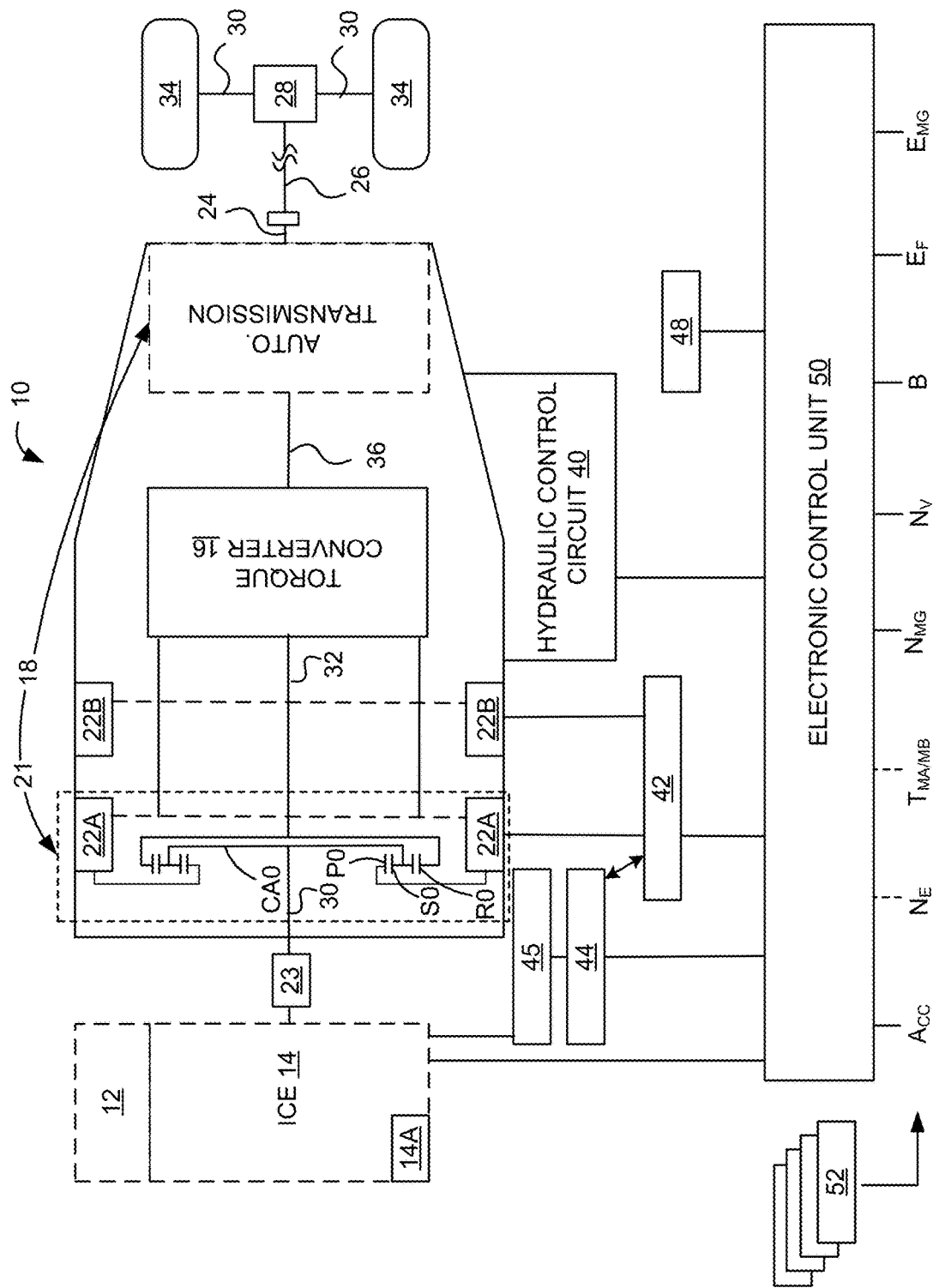
FIG. 1 is a schematic representation of a hybrid electric vehicle in which drive power can be controlled through the application of negative or regenerative torque in accordance with various embodiments of the present disclosure.

The figures are not exhaustive and do not limit the present disclosure to the precise form disclosed.

DETAILED DESCRIPTION

Various embodiments of the present disclosure are directed to counteracting the engine-on condition in an HEV when the HEV is coasting (e.g., while traveling along a downhill slope). A pinion gear, also referred to as a sun gear, is one component of a planetary gear set. A pinion gear overspeed condition may harm the motor or motor-related hardware. Control systems for HEVs may calculate a pinion gear speed limit in the transaxle above which those failures may occur. Accordingly, such control systems implement a mechanism whereby when the pinion gear speed surpasses a threshold reflecting the pinion gear speed limit, the engine of the HEV is automatically turned on. Use of the engine will cause a reduction in pinion gear speed and/or the relative speed between the pinion gear and other associated components, e.g., the planet gears, the ring gear, the carrier, etc., avoiding hardware failure.

As alluded to above, control systems for HEVs do not prevent an HEV that is coasting from exceeding the pinion gear speed limit or maximum EOV speed, thus necessitating entering the engine-on condition to avoid hardware failure. Accordingly, in certain scenarios, an HEV may be traveling along a down slope, and without user input or a user request, the engine of the HEV will turn on. This can result in less-than-ideal fuel economy because the engine will consume fuel when on, even when use of the engine is not necessarily needed (since the HEV is coasting, e.g., downhill). Additionally, regenerative energy recuperation opportunities may be missed. Moreover, a user (e.g., the driver of the HEV) may have an undesirable driving experience due to an unwanted or unintended engine-on condition.

In order to prevent the engine on-condition while an HEV is coasting, negative motor torque can be used to generate a braking force thereby decelerating the HEV. Decelerating the HEV will serve to reduce the speed at which the pinion gears of the planetary gear set are rotating (below the pinion gear speed limit), and accordingly, reduce the speed of the vehicle below the maximum EOV speed. This negative motor torque can be used to charge the HEV's battery, referred to as, e.g., regenerative braking torque, regenerative torque, or simply regen torque. A processing loop(s) may be used to measure one or more operating conditions of the HEV. Based on those operating conditions relative to certain thresholds, when regenerative torque is applied and the amount of regenerative torque generated and applied can be controlled.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 is a schematic representation of an example HEV 10 in which, according to various embodiments, drive power may be adjusted to counteract excessive pinion gear speed. It should be noted that for clarity of the illustration, not all elements of HEV 10 are labeled with a reference numeral. For example, in some cases, only one of two or more elements or components of HEV 10 are labeled with a reference numeral. However, it can be assumed that the functionality and/or operation of similarly-illustrated elements or components are the same or substantially similar, unless described otherwise. Moreover, aspects of HEV 10 may be described from the perspective of one/one set of elements or components. It can be assumed that secondary instances of those elements or components may operate the same or in a similar manner. It should also be noted that for ease of description and clarity of figures, not all components of an HEV have been illustrated, and that the figures and corresponding descriptions are not meant to be limiting. It should be further noted that an HEV may embody certain variations with respect to its elements or components, which are contemplated herein. For example, HEV 10 may be configured with a single motor or with two motors.

The drive system of HEV 10 may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18 (which may be an automatic transmission, and can include a power delivery mechanism 21), a differential gear device 28, and a pair of axles 30.

As an HEV, vehicle 10 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 10 relies on the motive force generated at least by internal combustion engine 14. In the EV travel mode, vehicle 10 is powered by the motive force generated by motor 22 while engine 14 may be stopped.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motors 22 can also be used to provide motive power in HEV 10 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motors 22 operate as generator.

Motors 22 can be powered by battery 44 to generate a motive force to move the vehicle and adjust vehicle speed. Motors 22 can also function as a generator to generate electrical power such as, for example, when coasting or braking. Battery 44 may also be used to power other electrical or electronic systems in the vehicle. Motors 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries. With the inverter 42 controlled by electronic control unit 50 that will be described below, motor 22A torque $T_{ma}$ and motor 22B torque $T_{mb}$ as output torque (or regenerative torque) of each of motor 22A and motor 22B are controlled.

Power distribution mechanism 21 may be a single-pinion-type planetary gear set having three rotating elements, i.e., a sun gear S0, a ring gear R0 disposed concentrically with the sun gear S0, and a carrier CA0 that supports pinion gears P0 that mesh with the sun gear S0 and the ring gear R0 such that the pinion gears P0 can rotate about themselves and rotate about the axis of the gear set. Power distribution mechanism 21 functions as a differential mechanism that performs differential operation. In transmission 18, engine 14 is coupled to the carrier CA0 via a damper 23 such that power can be transmitted between the engine 14 and the carrier CA0, and motor 22 is coupled to the sun gear S0 such that power can be transmitted between motor 22A and the sun gear S0, while second motor 22B is coupled to the ring gear R0 such that power can be transmitted between the second motor 22B and the ring gear R0. In the power distribution mechanism 21, the carrier CA0 functions as an input element, and the sun gear S0 functions as a reaction-force element, while the ring gear R0 functions as an output element.

Power distribution mechanism 21 may have three rotating elements, e.g., the carrier CA0 to which the engine 14 is operatively coupled, the sun gear S0 to which motor 22A as an electric motor for differential operation is operatively coupled, and the ring gear R0 to which motor 22B as an electric motor for running the vehicle is operatively coupled. Namely, transmission 18 has power distribution mechanism 21 operatively coupled to the engine 14, and motor 22A operatively coupled to power distribution mechanism 21. In transmission 18, an electric continuously variable transmission 30 as an electric speed change mechanism (electric differential mechanism) is constructed in which an operating state of motor 22A is controlled so that a differential status of power distribution mechanism 21 is controlled. The electric continuously variable transmission 30 is operable to change the speed ratio γ0 (=engine speed $N_E$/motor 22B rotational speed $N_M$).

Transmission 18 (which can be an automatic transmission (AT)) may be a mechanical speed change mechanism that provides a part of a power transmission path between a transmission member 32 as an output rotating member of the electric continuously variable transmission 30, and the drive wheels 34. The transmission member 32 is coupled integrally with the ring gear R0 and is also coupled integrally with a transmission input shaft (AT input shaft) 36 as an input rotating member of automatic transmission 18. Motor 22B is coupled to the transmission member 32 such that power can be transmitted between motor 22B and the transmission member 32. Accordingly, automatic transmission 18 is a mechanical speed change mechanism that provides a part of a power transmission path between motor 22B and the drive wheels 34. Transmission 18 performs so-called clutch-to-clutch shifting by engaging and releasing selected ones of the two or more engagement devices (namely, by switching engaged and released states of the engagement devices). Transmission 18 may change the speed ratio through engagement and release of the engagement devices, so as to form a selected one of two or more gear positions having difference speed ratios (gear ratios) γat (=AT input rotational speed Ni/AT output rotational speed No).

The above-mentioned engagement devices may be hydraulic friction devices that transmit rotation and torque between the transmission input shaft 34 that receives power from the engine 14 and motor 22B, and the transmission output shaft (AT output shaft) 36 as an output rotating member of transmission 18 that transmits power to the drive wheels 34. The torque capacity (clutch torque) of each of the engagement devices is changed by regulating the engaging hydraulic pressure (clutch pressure) by means of a solenoid valve, or the like, in a hydraulic control circuit 40 included in transmission 18, so that engagement and release of the engagement device are controlled. In this embodiment, the two or more engagement devices will be called "clutches C", for the sake of convenience, but the clutches C include known brakes, etc., as well as clutches.

An electronic control unit (ECU) 50 (described below) may be included and may control the electric drive components of the vehicle as well as other vehicle components. For example, ECU 50 may control inverter 42, adjust driving current supplied to motor 22, and adjust the current received from motor 22 during regenerative coasting and breaking. As a more particular example, output torque of the motor 22 can be increased or decreased by ECU 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

As alluded to above, vehicle 102 may include an ECU 50. ECU 50 may include circuitry to control various aspects of the vehicle operation. ECU 50 may include, for example, a microcomputer that includes a one or more processing units (e.g., microprocessors), memory storage (e.g., RAM, ROM, etc.), and I/O devices. The processing units of ECU 50, execute instructions stored in memory to control one or more electrical systems or subsystems in the vehicle. ECU 50 can include a plurality of ECUs such as, for example, an electronic engine control module, a powertrain control module, a transmission control module, a suspension control module, a body control module, and so on. As a further example, ECUs can be included to control systems and functions such as doors and door locking, lighting, human-machine interfaces, cruise control, telematics, braking systems (e.g., ABS or ESC), battery management systems, and so on. These various control units can be implemented using two or more separate ECUs, or using a single ECU.

In the example illustrated in FIG. 1, ECU 50 receives information from a plurality of sensors included in vehicle 10. For example, ECU 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_v$. These may also include torque converter 16 output, $N_T$ (e.g., output amps indicative of motor output), regenerative torque (e.g., $T_{MA}$ and $T_{MB}$ alluded to above), brake operation amount/pressure, B, battery SOC (i.e., the charged amount for battery 44 detected by an SOC sensor), battery temperature, $T_B$, motor temperature $T_M$. Accordingly, HEV 10 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+motor 22) efficiency, acceleration, $A_{CC}$, accelerator position, $A_P$, gear shift position, $G_P$, sensed road grade, $G_R$, road load, RL, pinion gear speed, $V_P$, heating ventilation and air conditioning (HVAC) settings, etc.

In some embodiments, one or more of the sensors 52 may include their own processing capability to compute the results for additional information that can be provided to ECU 50. In other embodiments, one or more sensors may be data-gathering-only sensors that provide only raw data to ECU 50. In further embodiments, hybrid sensors may be included that provide a combination of raw data and processed data to ECU 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
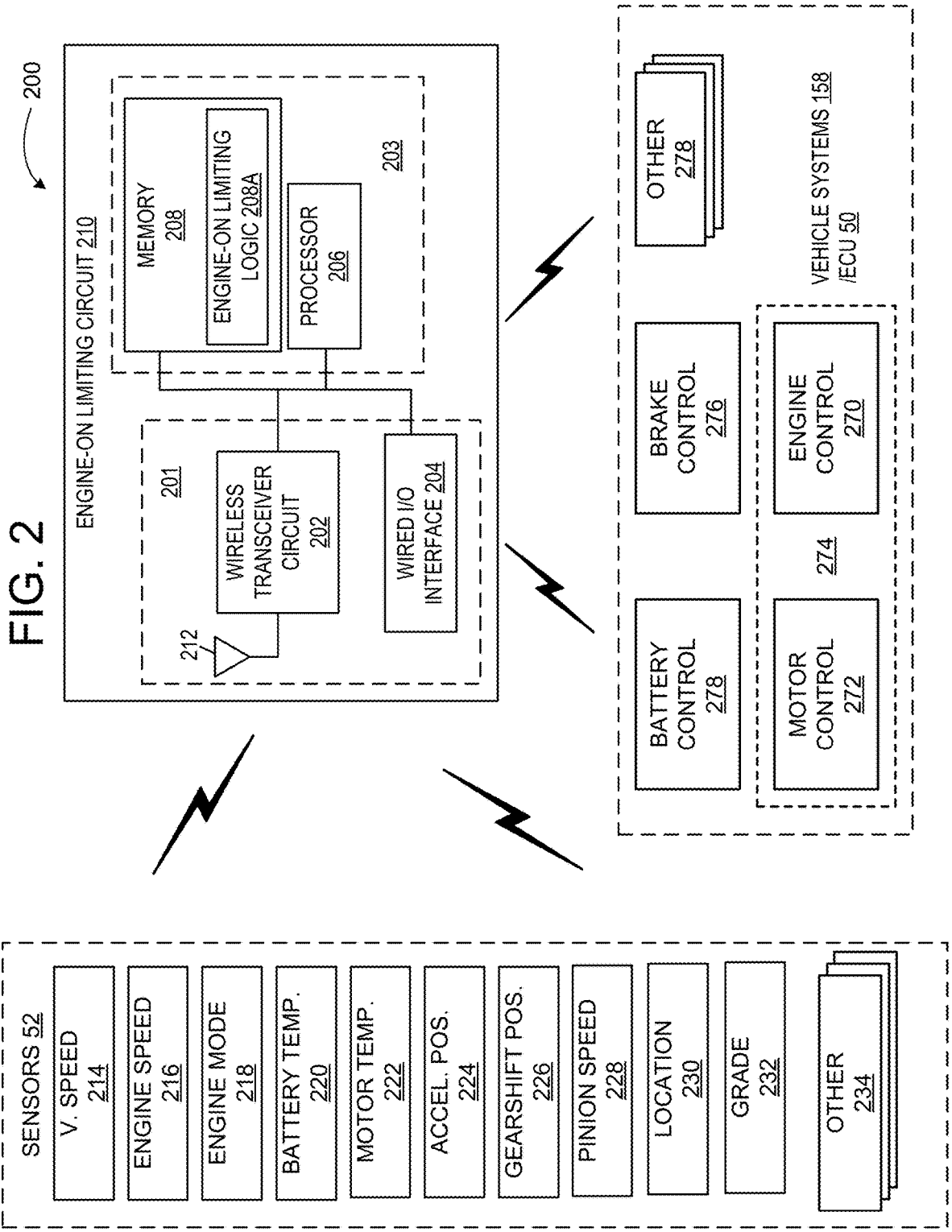
FIG. 2 is a functional block diagram illustrates component parts of a control function included in an electronic control unit of the hybrid vehicle illustrated in FIG. 1.

FIG. 2 illustrates an example architecture for controlling the application of and the amount of regenerative torque applied in an HEV during a coasting condition in accordance with at least one embodiment of the systems and methods described herein. FIG. 2 illustrates a plurality of sensors 52 (some of which may have been introduced in FIG. 1).

Sensors 52 may include a vehicle speed sensor 214 for determining vehicle speed, $N_V$. Vehicle speed sensor 214 may be, for example, a transmission speed/transaxle or wheel speed sensor. Sensors 52 may also include an engine speed ($N_E$) sensor 216 that may be attached to a crankshaft of engine 14 for determining crankshaft spin speed which is indicative of the speed of engine 14. Sensors 52 may include an engine mode sensor 218 to determine whether the engine 14 is operating (in an engine-on mode or condition) or non-operational (in an engine-off mode or condition). It should be understood that engine mode sensor 218 may be its own sensor or may be a monitoring component or function of engine control component 270 (described below) or ECU 50 that is aware of the operational mode of HEV 10. Further still, sensors 52 may include a battery temperature ($B_T$) sensor 220, a motor temperature ($T_M$) sensor 222, an accelerator pedal position sensor 224, gearshift position sensor 226, and pinion speed sensor 228. Moreover, sensors 52 may include a location sensor 230. Location sensor 230 may comprise a global positioning systems (GPS) sensor/receiver/transceiver or other location component configured to determine a location of HEV 10. In some embodiments location sensor 230 may incorporate other location-determining capabilities, such as WiFi triangulation (as an alternative to or in addition to GPS sensing). Sensors 52 may also include a road grade sensor 232 for determining the grade of a road/path being traversed by HEV 10. Road grade sensor 232 may be, e.g., an inclinometer, tilt sensor, gradient meter, or some component capable of computing or estimating the slope of a road/path alone or in conjunction with other sensor data. Still other sensors 234 may make up sensors 52 of HEV 10.

It should be noted that the sensor data provided by any one or more of sensors 52 may be received from a sensor or entity remotely located from HEV 10. For example, vehicle speed, location, and/or grade data or information may be obtained from other vehicles (either nearby vehicles or vehicles that have traveled or are aware of such information). Such third-party information or data may be received by HEV 10 via V2X communications or other communications method(s).

The aforementioned sensor data or information may be communicated to engine-on limiting circuit 210, to allow engine-on limiting circuit 210 to determine when the engine-on condition should be limited by applying regenerative torque, and the amount of regenerative torque to be applied. Engine-on limitation circuit 210 may include communications circuit 201, which can include, but is not limited to a wireless transceiver circuit 202 and a wired input/output interface 204 (with an associated hardwired data port (not illustrated)).

As this example illustrates, communications with engine-on limiting circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by engine-on limiting circuit 210 to/from other entities such as sensors 52 and vehicle systems 158/ECU 50.

Wired I/O interface 204 can include a transmitter and a receiver (not shown) for hardwired communications with other devices. For example, wired I/O interface 204 can provide a hardwired interface to other components, including sensors 52 and vehicle systems 158/ECU 50. Wired I/O interface 204 can communicate with other devices using Ethernet or any of a number of other wired communication protocols whether standardized, proprietary, open, point-to-point, networked or otherwise.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory, and may be configured to store data and other information as well as operational instructions that may be used by the processor 206 to assist-mode detection/activation circuit 210.

Accordingly, communications circuit 201 may receive sensor data regarding pinion speed (from pinion speed sensor 228), for example, and engine-on limiting circuit 210 may determine that regenerative torque should be added to the drivetrain in order to reduce current pinion speed. For example, pinion speed sensor 228 may sense a particular pinion speed which can be transmitted, via communications circuit 201, to decision circuit 203 where processor 206 is executing engine-on limiting logic 208A. Decision circuit 203 may, by way of engine-on limiting logic 208A, compare the currently sensed pinion speed to a threshold pinion speed reflecting, e.g., a maximum pinion speed above which, bearing/gear damage or failure may occur. In response, such a determination, engine-on limiting logic 208A by way of communications circuit 201 may transmit an appropriate control or instruction signal to, e.g., motor control 272 (described below) in order to effectuate the application of regenerative torque vis-à-vis power delivery mechanism 21 and/or any related components, e.g., torque converter 16, motor 22A, etc.

It should be understood that engine control component 270 controls the drive (output torque) of engine 14 via the output control device 14A. Specifically, engine control component 270 controls output control device 14A by way of an electronic throttle valve controlling the amount of fuel supplied by the fuel injection device, the ignition timing of the ignition device, etc. Accordingly, ECU 50 controls the manner in which engine 14 provides drive power so that engine output required by engine 14 can be achieved.

Engine control component 270 drives engine 14 in the engine-only and HEV travel modes. For example, engine control component 270 may control when engine 14 is started, e.g., when switching from EV travel mode to the engine-only travel mode or the HEV travel mode. For example, engine control component 270 can instruct engine 14 to revolve resulting in an engine revolution speed $N_E$, and the supply of fuel to engine 14 is started via the output control device 14A. Likewise, engine control component 270 may control when engine 14 is shut off, e.g., when switching from engine-only or HEV travel mode to EV travel mode. This can occur when HEV 10 is coasting. However, as noted above, engine 14 may turn on (via an engine-on control signal from engine control component 270) upon a determination that the pinion speed of the planetary gear set's pinion gear exceeds a pinion gear speed threshold. To prevent this from occurring, in certain scenarios, based on a temporary increase in, e.g., battery SOC limits, or battery charging rate limits, this engine-on/engine-only travel mode may be overridden. When hybrid vehicle 10 is to be operated in EV mode, engine control component 50A outputs a control signal(s) to output control device 14A for stopping engine 14.

Motor control component 272 controls actuation of the motor 22A, for example, via the inverter 42. Specifically, electric energy is supplied from battery 44 to motor 22A via inverter 42. Motor control component 272 outputs a control signal(s) for driving motor 22A to rotate and generate positive or negative motor torque to obtain the output required of the motor 22A. For example, upon determining that HEV 10 is coasting in an EV travel mode, and that the pinion gear speed has reached/exceeded (or is approaching its threshold), motor control component 272 outputs a control signal(s) instructing inverter 42 to switch phase and change the direction of the magnetic field applied to motor 22A. This generates negative motor torque that reduces the speed of the pinion gear, and resists the forward momentum of HEV 10 so that HEV 10 decelerates.

It should be understood that engine control 270 and motor control 272, together may make up a travel mode component 274, which can, for example, make determinations regarding a travel mode established in HEV 10 or on the basis of a target driving force. A determination can be made regarding which travel mode (electric vehicle (EV), engine-only, HEV) HEV 10 is in on the basis of, e.g., vehicle speed $N_V$, accelerator operation/pedal actuation amount, $A_{CC}$, battery SOC of battery 44, brake operation amount B, etc. For example, if the battery SOC of battery 44 indicates a low SOC, travel mode component 274 may determine a need to switch from an EV/HEV travel mode to an engine-only travel mode.

As will be described below in greater detail, other determinations impacting this decision and other actions taken in response to this decision can be made and/or taken, e.g., considering and acting on battery state of charge (SOC) and charge power limits, respectively, friction braking, etc. Accordingly, engine-on-limiting circuit 210 may communicate appropriate control signals to battery control component 278 (which can control one or more operating aspects/ conditions regarding battery 44 and/or inverter 42), and brake control component 276 to control actuation of friction brakes. Engine-on-limiting circuit 210 may further communicate appropriate control signals to motor control 272 for, e.g., putting motor 22A into a generator mode of operation, and engine control 270 for, e.g., overriding a default engine-on control signal.

It should be understood that vehicle systems 158/ECU 50 may have other components or aspects with which engine-on-limiting circuit 210 may communicate with/control/receive information from. It should be further noted that vehicle systems 158 and ECU 50 are sometimes described in conjunction with one another as the above-noted components (and/or other components) may be controlled or may be functionally implemented as part of ECU 50. However, one or more of these components may alternatively be implemented as a "standalone" component, system, or aspect of HEV 10 that operates outside of, but e.g., in conjunction with ECU 50. For example, another component 278 may be a navigation component that may receive location sensor 230 information which can be leveraged by engine-on-limiting circuit 210 to determine whether HEV 10 is on a downhill slope while coasting. Further still, it should be understood that engine-on limiting circuit 210 (or one or more aspects thereof), may be implemented in or as part of ECU 50/vehicle systems 158.

Figure 3:
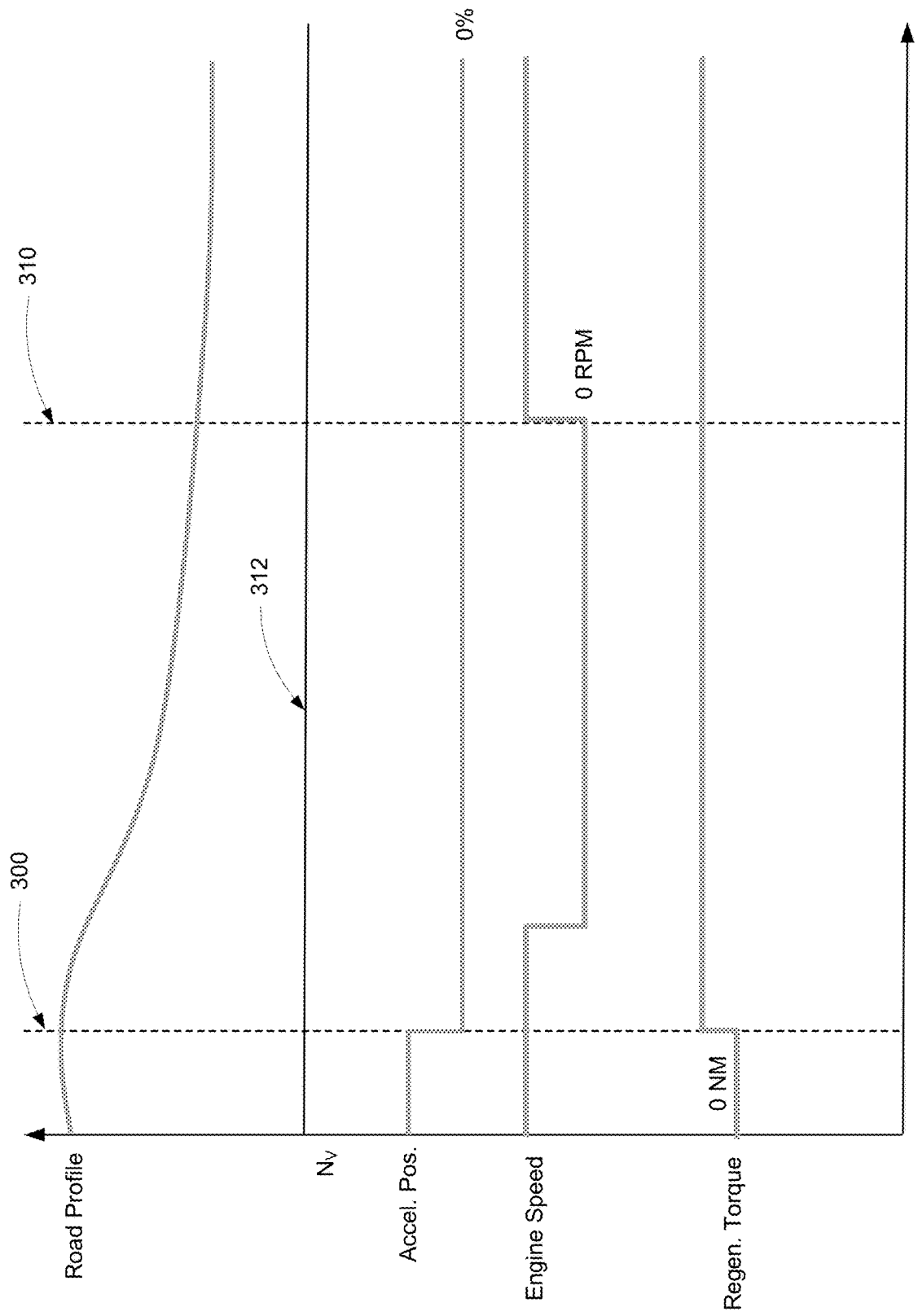
FIG. 3 is a graphical representation of road and vehicle conditions during which an HEV may enter an engine-on condition in accordance with various embodiments of the present disclosure.

FIG. 3 illustrates an example scenario in which HEV 10 is coasting on a downhill slope from a vehicle operational perspective. FIG. 3 illustrates two "stages" 300 and 310. A first stage 300 can refer to a time at which a driver of HEV 10 releases the accelerator pedal of HEV 10, and begins coasting, e.g., along a downhill section of road. That is, as illustrated in FIG. 3, the road profile at the first stage 300 begins to drop from a peak height (indicating a down grade). Accelerator position at the first stage 300 goes from some value or percentage down to zero due to the driver releasing the accelerator pedal, while vehicle speed, $N_V$, may begin to increase as HEV 10 begins to pick up speed from coasting downhill. Engine speed, similar to acceleration will eventually drop to 0 revolutions per minute (RPM) as a result of the accelerator pedal being released. It should be understood that engine speed can be reduced gradually or very sharply. In some cases, engine speed can be reduced to zero within one second.

Also at first stage 300, without implementing engine-on logic 208A (see, FIG. 2), some regenerative torque may be applied. The amount of regenerative torque capacity can vary by vehicle (e.g., based on motor specification). With a typical HEV, for example, approximately 200 Nm of maximum regenerative torque would be available at the motor. The amount of regenerative torque can be proportional to the amount of applied brake pedal actuation, until very low vehicle speed. In this case however, with no brake pedal being applied, a regenerative torque according to a speed and grade look-up table can be induced. The table can be defined/configured to set a "comfortable" level of deceleration feeling for the driver, which may not change appreciably in value unless the driver makes a change (vis-à-vis the accelerator pedal, brake pedal, or changes gearshift position) because it is typically designed to keep vehicle speed for a typical driving duration. This issue arises when the driver continues coasting, allowing vehicle speed to increase, without applying the brakes. It should be understood that such driving behavior is something "eco-drivers" will perform to improve fuel economy. For example, a table that can be used may reflect deceleration/regenerative torque as a function of simulated simulated gear and propeller shaft speed.

As HEV 10 continues to coast downhill, the second stage 310 is reached. Under conventional operating logic/control, when the vehicle speed of HEV 10 exceeds a maximum speed threshold (EOV speed 312), engine 14 is turned on to protect the motor 22A hardware, such as the bearings, magnets, etc.

Under conventional operating logic, engine speed increases from zero RPMs, and the speed of HEV 10 increases, while the amount of regenerative torque (from motor 22A) remains constant regardless of this condition. However, as already noted, this conventional logic can result in decreased fuel economy due to engine 14 being turned on and can be detrimental to the driving experience since the driver has not requested that engine 14 be turned on.

Figure 4:
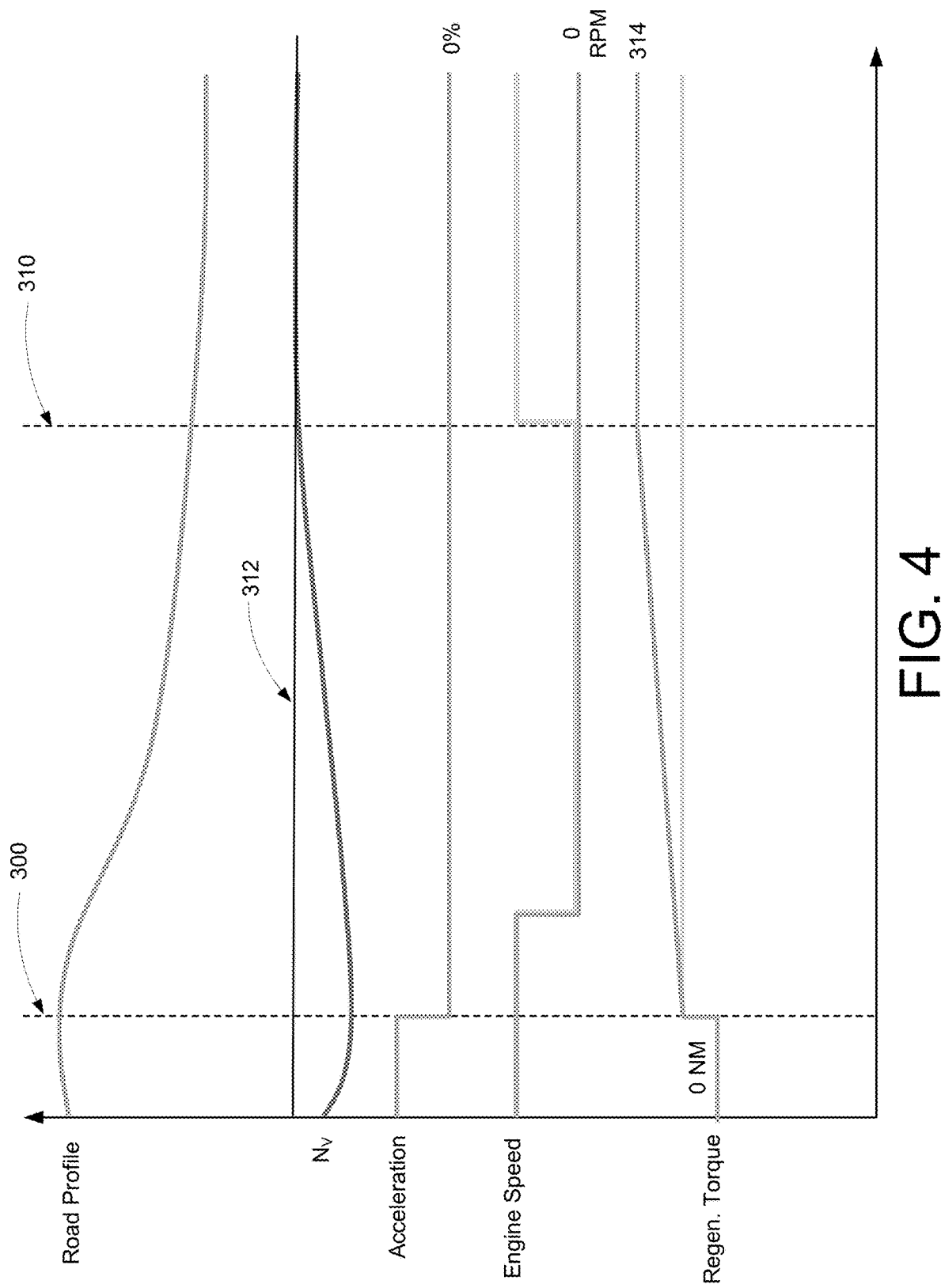
FIG. 4 is a graphical representation of the application of regenerative torque in response to the road and vehicle conditions of FIG. 3 in accordance with various embodiments of the present disclosure.

Accordingly, in one embodiment, as illustrated in FIG. 4, upon reaching the maximum vehicle speed threshold (EOV speed), regenerative torque 314 may be added (or the amount of regenerative torque may be increased from the conventional amount) to the drive power. This causes HEV 10 to decelerate and reduces the vehicle speed of HEV 10. This can cause engine 14 to remain in an engine-off condition (maintaining HEV 10 in an EV travel mode), i.e., engine RPMs remain at zero at the second stage 310 and after. Vehicle speed at the second stage 310 and afterwards, does not increase. Again, in conventional HEVs, vehicle speed, as a result of coasting downhill, would increase past the EOV speed, necessitating the engine-on condition. Here, that is not needed as the vehicle speed is maintained below the EOV speed.

Figure 5:
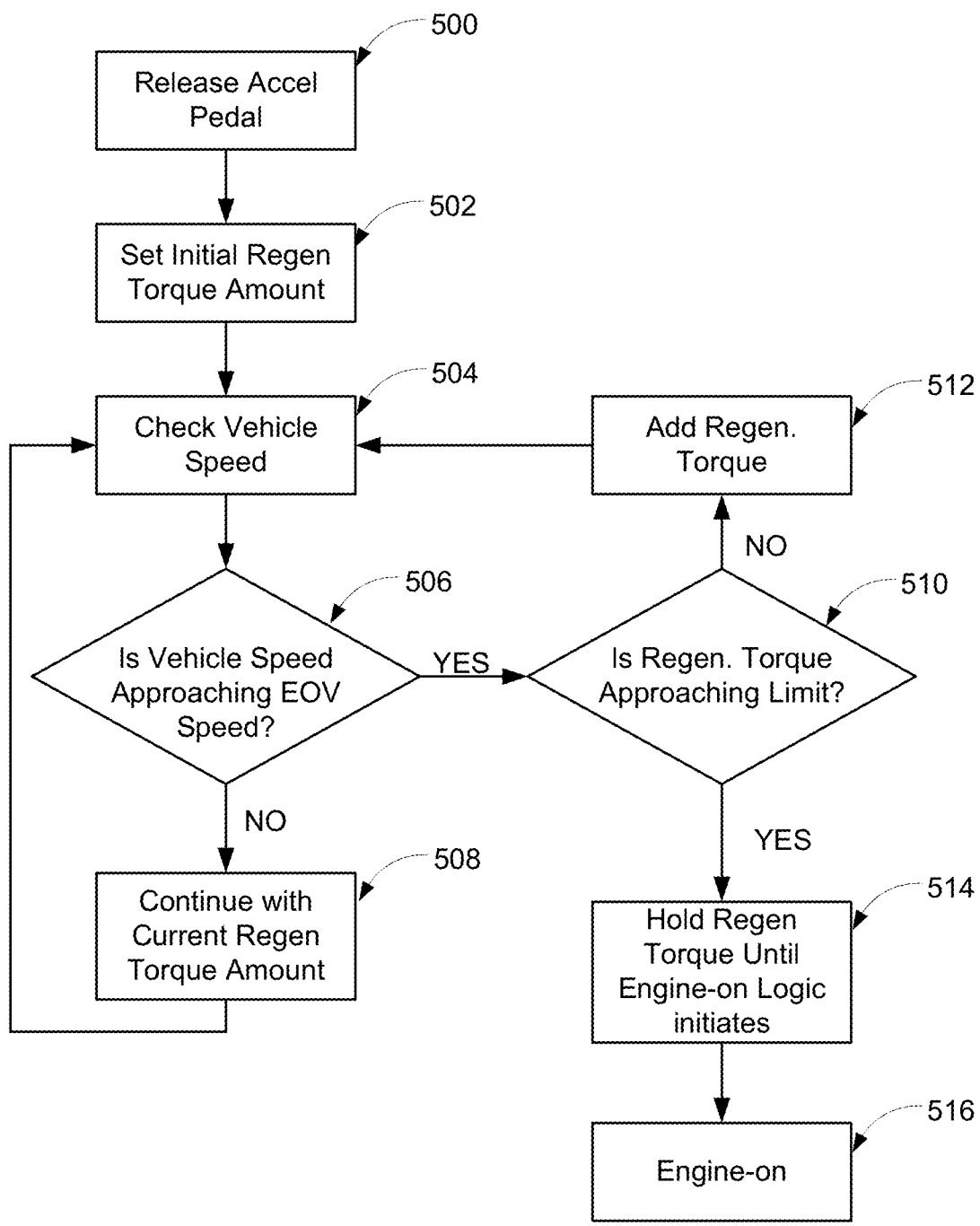
FIG. 5 is a flow chart illustrating example operations that may be performed to apply regenerative torque in response to the road and vehicle conditions of FIG. 2 in accordance with various embodiments of the present disclosure.

FIG. 5 is a flowchart illustrating example operations that can be performed in accordance with one embodiment for adding regenerative torque to the drive power to avoid an engine-on condition. At operation 500 (which corresponds to first stage 300 of FIG. 4), the accelerator pedal may be released. This condition may be sensed by accelerator pedal position sensor 224 (FIG. 2). This may suggest that HEV 10 is coasting. Based on HEV 10 operating conditions prior to releasing the accelerator pedal, an initial regenerative torque amount may be set at operation 502, e.g., by engine-on limiting circuit 208A. In some embodiments, current HEV 10 operating conditions may be confirmed. Current vehicle operating conditions including, but not necessarily limited to the following may be considered when setting the initial regenerative torque amount: battery 44 SOC, vehicle speed of HEV 10, engine 14 speed, current travel mode/engine mode, the respective temperatures of battery 44 and motor 22A, the accelerator pedal position, and gearshift position. Again, initial regenerative torque amount may be determined by vehicle speed, in some instances primarily by vehicle speed. Initial regenerative torque amount can be reflected as a calibrated curve as part of zero percent accelerator pedal driving force that simulates what a traditional transmission provides by engine braking. Other conditions such as battery SOC can limit the available regenerative torque (e.g., as a battery approaches a completely full SOC), i.e., the amount of current that can be generated and put into the battery is limited. This current value can be impacted by many limitations including motor temperature and battery temperature. It should be noted that if the engine is already running, the motor doesn't need to command as much torque, and the engine can run in fuel cut mode to increase the pumping losses internal to the engine. This is what occurs, for example, when the driver shifts to B-range in an HEV, and is variable in S-range equipped HEVs.

As HEV 10 progresses past first stage 300 (and HEV 10 continues to coast in EV mode), HEV 10 vehicle speed may be checked at operation 504. A determination may be made at operation 506 regarding whether HEV 10 is approaching the EOV speed. If the vehicle speed of HEV 10 is not nearing the EOV speed 312, the initial amount of regenerative torque (determined at operation 502) may continue to be applied at operation 508. Checking the vehicle speed of HEV 10 at operation 504 may be repeated periodically (or aperiodically, e.g., the closer the vehicle speed of HEV 10 approaches the EOV speed 312, the more frequently vehicle speed is checked).

On the other hand, if the vehicle speed of HEV 10 is approaching the EOV speed 312, a determination is made as to whether or not the amount of regenerative torque being added is approaching a regenerative torque limit at operation 510. This regenerative torque limit may be determined (or dynamically set) based on, e.g., battery SOC, battery temperature, and/or other operating conditions. For example, a battery, such as battery 44 may have an optimum SOC level (e.g., 80-85% full), a maximum operating temperature (above which, battery 44 may begin to degrade or experience performance degradation) and the like. In some embodiments, the optimum SOC level may be impacted by forecasted driving conditions, such as upcoming or current traffic conditions, upcoming or current road grade, etc. For example, certain logic used in HEV 10 may optimize battery SOC in terms of the length of a downhill slope such that battery 44 may be depleted a certain amount to maximize recouping of energy while traveling the downhill slope.

If the amount of regenerative torque being applied is not nearing the limit, additional regenerative torque may continue to be added according to a determined EOV speed-to-regenerative torque amount mapping in order to maintain HEV's speed below the EOV speed at operation 512. Table 1 below is an example mapping.

TABLE 1

| Maximum Torque Limit (~200 Nm) | | | | | | |
|---|---|---|---|---|---|---|
| Small  | Small  | Small  | Small  | Small  | Small  | EOV Speed |
| Small  | Small  | Small  | Small  | Medium | Medium | Limit |
| Medium | Medium | Medium | Medium | Large  | Large  | (45 mph) |
| Medium | Medium | Medium | Medium | Large  | Large  | |
| Medium | Medium | Medium | Medium | Large  | Large  | |

In Table 1, the "values" can represent how much additional torque would be added based on a current value in the mapping. For example, as the HEV approaches the EOV speed limit, torque can be increased as much as possible to prevent over-running the limit, until the torque gets closer to the torque limit. The actual values could be approximately 5 Nm in the "small" case to 20 to about 50 Nm in the "large" case, for example.

If the amount of regenerative torque is nearing the limit, the amount of regenerative torque is maintained at its current level at operation 514 until conventional engine-on logic initiates and engine 14 turns on (to offset the EOV speed) at operation 516.

It should be understood that the above-described operations of FIG. 5 may be performed by engine-on limiting logic 208A of engine-on limiting circuit 210. For example, the initial amount of regenerative torque to be applied to the drive power can be set by calculations performed vis-à-vis engine-on limiting logic 208A and/or vehicle/pinion gear speed to regenerative torque mappings maintained in memory 208. One or more of the aforementioned sensors 52 can transmit sensed data, such as accelerator pedal position, road profile/grade, vehicle speed, etc. which can be received by communications circuit 201 and processed by processor 206 in accordance with engine-on limiting logic 208A embodied by the operations of FIG. 5.

Figure 6:
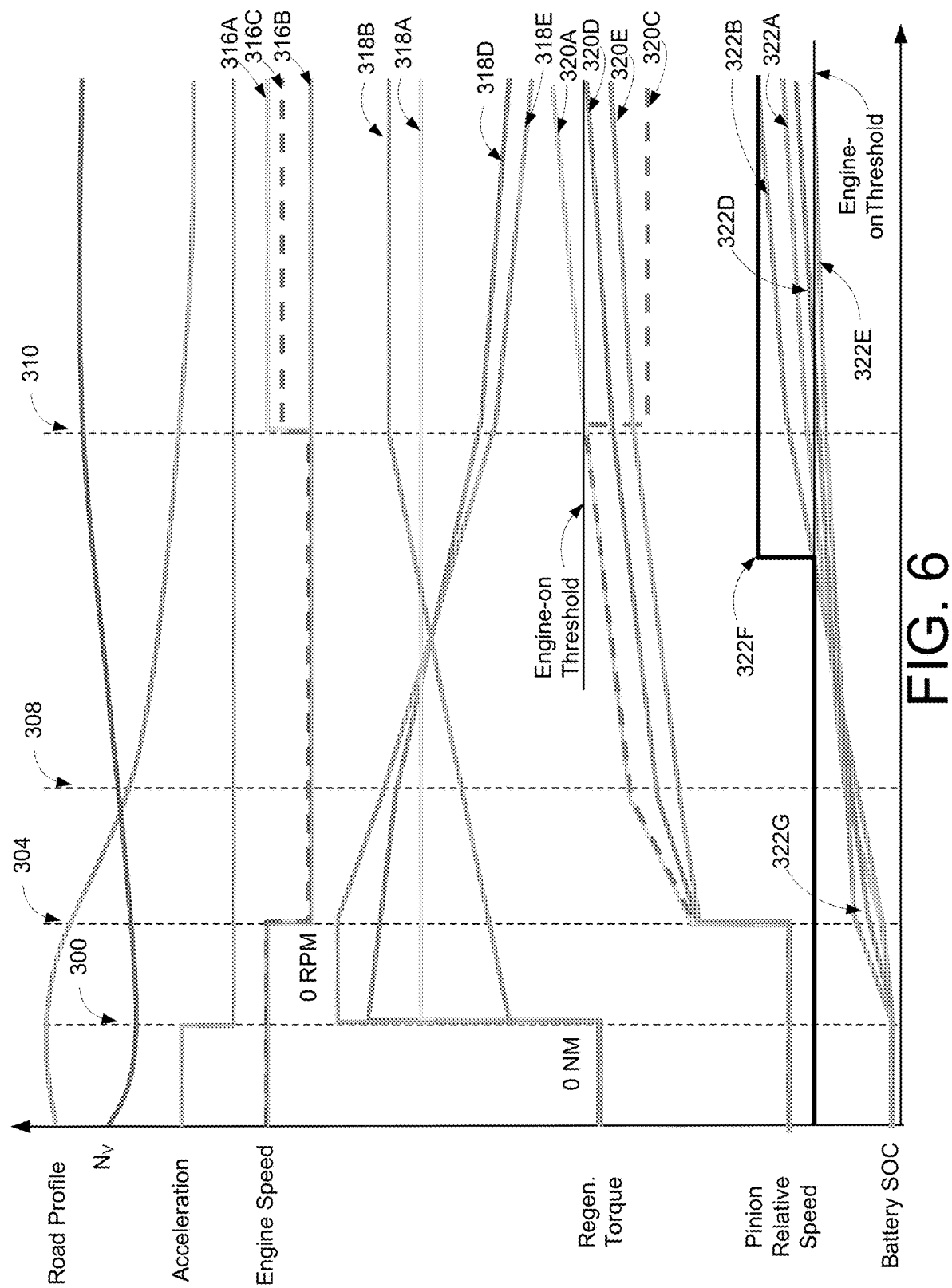
FIG. 6 is a graphical representation of example mechanisms controlling the application of regenerative torque in response to the road and vehicle conditions of FIG. 2 in accordance with various embodiments of the present disclosure.

FIG. 6 illustrates another example scenario in which HEV 10 is coasting on a downhill slope from a vehicle operational perspective, along with one or more related actions for preventing an engine-on condition from occurring. Similar to FIGS. 3 and 4, FIG. 6 illustrates the occurrence of stages 300 and 310. A first stage 300 can refer to a time at which a driver of HEV 10 releases the accelerator pedal of HEV 10, and begins coasting, e.g., along a downhill section of road. This is evidenced by the road profile at the first stage 300, which begins to drop from a peak height (indicating a downhill grade). Accelerator position at the first stage 300 goes from some value or percentage down to zero due to the driver releasing the accelerator pedal, while vehicle speed, $N_V$, may begin to increase as HEV 10 begins to pick up speed from coasting downhill. Engine speed, similar to acceleration will eventually drop to zero revolutions per minute (RPM) as a result of the accelerator pedal being released. Also, at first stage 300, without implementing engine-on logic 208A, some regenerative torque may be applied. As HEV 10 continues to coast downhill, the second stage 310 is reached.

However, FIG. 6 illustrates an intermediate stage 304, which coincides with the engine speed dropping to zero RPM. That is, in accordance with one embodiment of the systems and technologies disclosed herein, a method for preventing the engine-on condition during coasting can involving operating engine 14 of HEV 10 in a fuel cut mode. For example, engine-on limiting logic 208A may instruct or send a control signal to engine control component 270 to stop injecting fuel into engine 14, e.g., by shutting off the fuel injector(s) and/or reducing injector pulse. In doing so, as engine speed rises (upon nearing or reaching the EOV speed at stage 310).

Again, and similar to FIGS. 3 and 4, FIG. 6 illustrates that as HEV 10 continues to coast downhill, stage 310 is reached which reflects when the vehicle speed of HEV 10 (reaches or exceeds a maximum speed threshold (EOV speed). Conventionally, it is at or near this stage when engine 14 would be turned on, and engine speed would increase (316A) to protect the motor 22A hardware, the planetary gear set, and battery 44. Under conventional operating logic, engine speed increases from zero RPMs, and the vehicle speed of HEV 10 increases, while the amount of regenerative torque (318A) from motor 22A remains constant regardless of this condition. Accordingly, battery SOC (322A) also increases as battery 44 will absorb the addition energy or power (will be charged) vis-à-vis the regenerative torque.

As also previously illustrated in FIG. 4, upon reaching the maximum vehicle speed threshold (EOV speed), regenerative torque 318B may be added (or the amount of regenerative torque may be increased from the conventional amount) to the drive power. This causes HEV 10 to decelerate and reduces the vehicle speed of HEV 10. This can cause engine 14 to remain in an engine-off condition (maintaining HEV 10 in an EV travel mode), i.e., engine RPMs remain at zero at the second stage 310 and after (316B). Vehicle speed at the second stage 310 and afterwards, does not increase. Alternatively, however, by operating engine 14 in a fuel cut mode as alluded to above, engine speed may increase at stage 310, but still remain below the "unchecked" engine speed if no compensatory action(s) were taken (316C). Accordingly, the engine-on condition can still be avoided in accordance with this embodiment.

Moreover, referring to the relative pinion gear speed illustrated in FIG. 6, it can be appreciated that pinion relative speed may rise at stage 304 (due to the downhill coasting condition). As noted above, the planetary gear set and associated componentry of HEV 10 should also be protected from damage or failure. Thus, this increase in pinion relative speed (320A), if left unchecked, can be deleterious to the operation of HEV 10. FIG. 6 illustrates yet another intermediate stage 308, where the pinion relative speed increases even more due to the increased downhill grade (evidenced by the road profile). However, by operating engine 14 of HEV 10 in a fuel cut mode as described above, at stage 310, pinion relative speed can be reduced (320C) as well so that the engine-on condition or threshold is not reached.

Regarding the addition of increased regenerative torque to the drive system of HEV 14 during coasting conditions, it should be understood that in some embodiments, the amount of regenerative torque added can be governed by road grade. For example, the amount of regenerative torque that is to be added can be mapped according to how steep the downhill grade of a road may be. Between stages 300 and 308, for example, it can be appreciated that the road profile is a relatively constant downhill grade that begins to level off. In some examples, a relatively constant downhill grade may be, e.g., approximately two to eight percent grade (temporarily) depending on start speed. If start speed is relatively low, a steeper grade may be handled. Accordingly, the amount of regenerative torque that is added (318D) is commensurately reduced as that leveling off occurs. Between stages 308 and 310, the road profile indicates that the downhill grade levels off even more. Accordingly, the amount of regenerative torque needed to offset the EOV speed and/or pinion relative speed can decrease. After stage 310, where the road profile levels out further, again, the amount of regenerative torque is commensurately reduced. It should be appreciated that the impact to pinion relative speed (320D) is to reduce it and remain below the engine-on pinion relative speed threshold. Due to the increased regenerative torque being generated, the battery SOC may increase commensurately (322D). It should be understood that in this context, pinion relative speed can be the speed differential between S0 and engine 14 (FIG. 1) which is zero. As the engine speed is zero, the pinions are spinning close to, e.g., 10,000 rpm as they rotate around the sun gear. Moreover, as battery 42 recharges, the ability to apply torque and control based on that speed differential is reduced. As alluded to above, the state of battery 44 may also be taken into account when attempting to reduce pinion relative speed and/or vehicle speed to avoid an engine-on condition when HEV 10 is coasting. For example, in some embodiments, a temporary increase in charging rate may be enabled, allowing battery 44 to be charged regeneratively above its normal or default maximum charging rate. For example, a standard charging rate of 35 kW at approximately 200 amps, (although this can differ depending on motor capacity and inverter characteristics) whereas in accordance with one embodiment, the charging rate can be increased to, e.g., 40 kW at approximately 200 amps. Accordingly, the amount of regenerative torque (318E), which recharges battery 44 thereby increasing the battery SOC (322E), can be increased and applied to the drive power, again reducing the pinion relative speed (320E). It should be noted that this (and other increases in other vehicle operating conditions) is temporary, and not intended to be a prolonged increase. As noted above, batteries may experience quicker degradation due to increased charging rates, increased battery SOC, etc.

Various embodiments as will be described in greater detail below, may also use feedback logic to ensure that such increases are temporary and/or the state or condition of certain HEV 10 hardware is not damaged. As alluded to above, power limitation can be a function of battery SOC and can also factor into this scenario. In some embodiments the engine-on limiting logic 208A can begin reducing charging power limits as battery SOC begins to approach (but remains) less than approximately 80%, for example. The logic will reduce power from, e.g., 35 kW down to 0 kW gradually. Regenerative torque is limited by this power (again speed is set by vehicle speed and gear ratio) so torque can be cut/reduced in the same or similar fashion. Motor temperature as mentioned previously, can also be a consideration.

As noted above, vehicles utilizing two motors (such as HEV 10), one motor, e.g., motor 22A, can be used as an electric motor for differential operation, while another motor, e.g., motor 22B can be used for running the vehicle. Accordingly, it should be understood that in some embodiments, temperature of motor 22B (for generating regenerative torque) can be considered alone, while in some embodiments, temperature of both motors 22A and 22B can be considered as will be described below.

Still referring to the state of battery 44, yet another method of avoiding the engine-on condition can involve temporarily increasing the battery SOC upper limit. This allows for temporary over-charging of battery 44 (322F) vis-à-vis increased regeneration torque being generated and charging battery 44. This can be done in conjunction with, e.g., the application of additional regenerative torque (322B), boosted charging rate (322E). Further still, in accordance with another embodiment, a temporary charging temperature increase (322G) for battery 44 may be enabled in order to accommodate the added regenerative torque (and corresponding increase in heat). Enabling a temporary operating temperature increase would avoid the need for increasing the battery SOC limit (described above), providing yet another alternative mechanism for absorbing the additional energy associated with increased regenerative torque application to the drive power/drive train of HEV 10.

Figure 7A:
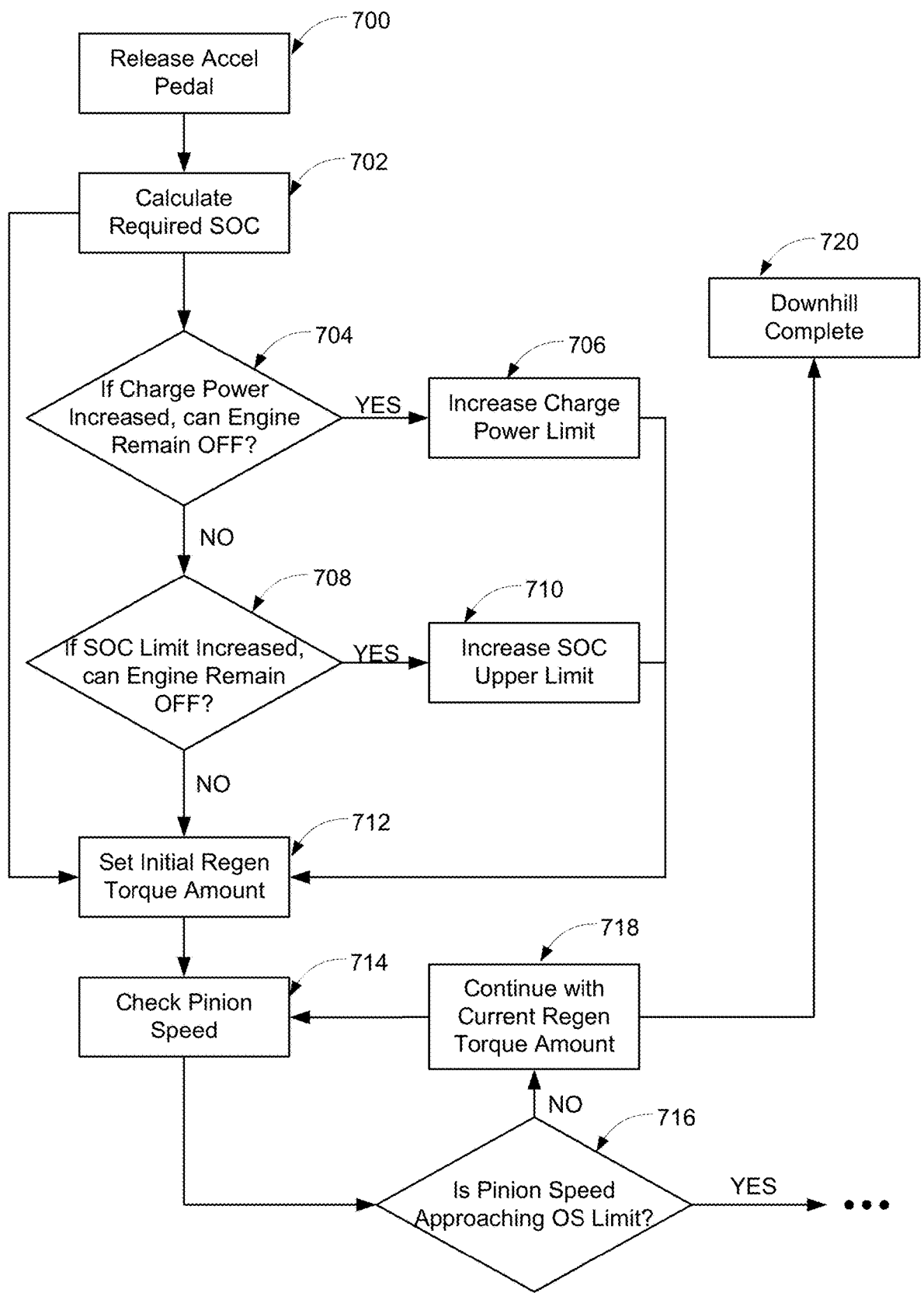
FIG. 7A is a flow chart illustrating example operations that may be performed to apply regenerative torque to prevent an engine-on condition in accordance with various embodiments of the present disclosure.
Figure 7B:
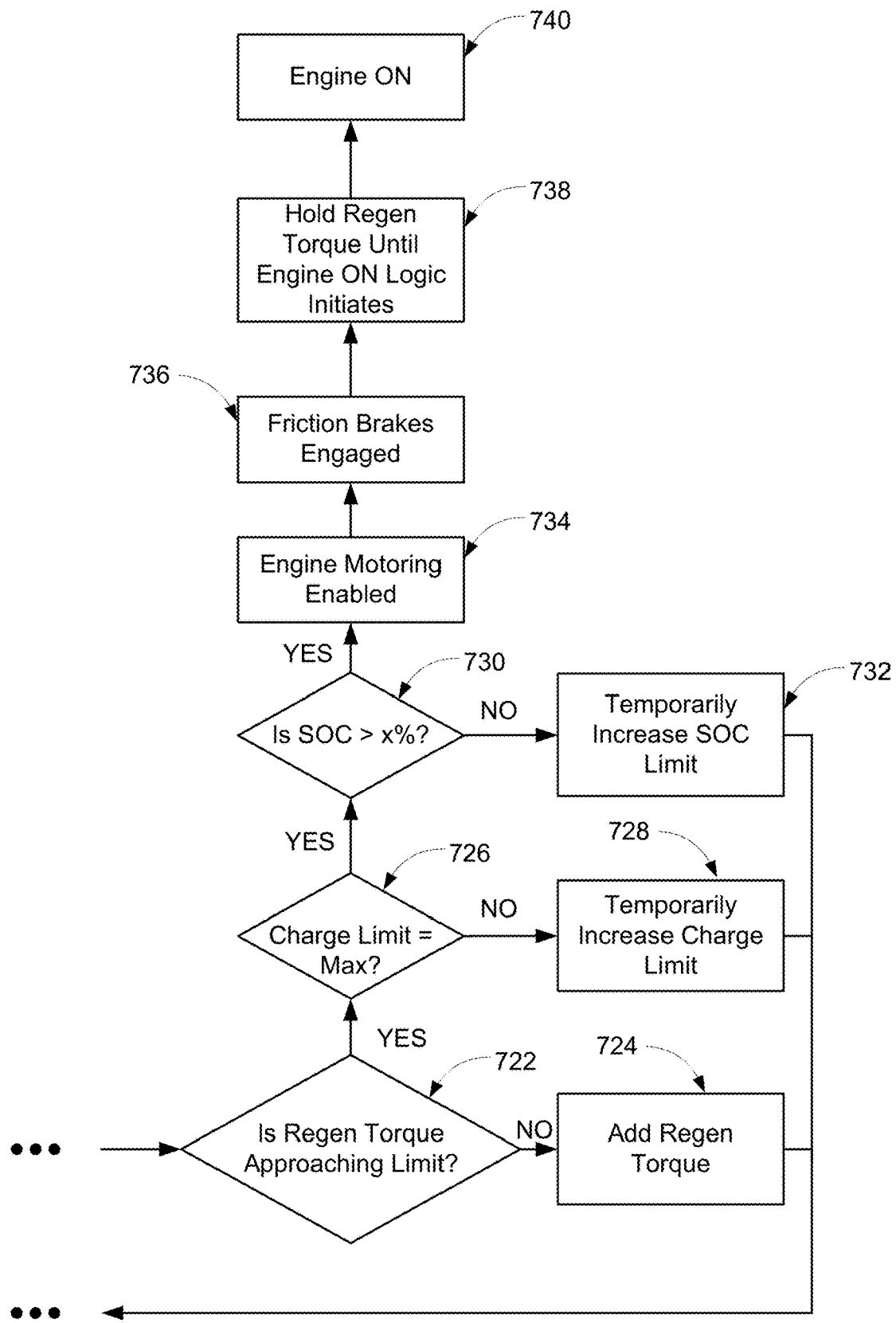
FIG. 7B is a continuation of the flow chart of FIG. 7A illustrating example operations that may be performed to apply regenerative torque to prevent an engine-on condition in accordance with various embodiments of the present disclosure.

FIGS. 7A and 7B illustrate a flow chart of example operations that can be performed by engine-on limiting logic 208A executed by processor 206 (FIG. 2) to limit an engine-on condition in accordance with one embodiment. Similar to the method of FIG. 5, the method of FIG. 7A may begin at operation 700 with the accelerator pedal being released by the driver. This may correspond with the stage 300 of FIG. 6. Again, sensor 224 may sense and report this condition to engine-on limiting circuit 208A to suggest that HEV 10 is coasting. At the same/approximately the same time, the following operating conditions and/or road conditions may be determined or obtained: battery 44 SOC; vehicle speed; engine speed; engine mode; battery 44 temperature; motor 22 temperature; gearshift position; HVAC operating conditions/settings; location; and/or road grade. Any one or more of the aforementioned sensors 52 may be used to ascertain these conditions. It should be understood that in this context, engine mode can refer to whether the engine is on with no load, on with a load, on under fuel cut mode (motoring), or shutting down. This can aid in identifying what is the current engine control strategy, and what to anticipate for, e.g., immediate future engine behavior.

At operation 702, a required battery SOC may be calculated, the required battery SOC being an SOC that allows HEV 10 to complete traversing a current downhill slope without engaging engine 14. This required battery SOC can be considered when setting an initial regenerative torque amount to be applied at operation 712. The initial amount of regenerative torque to be applied can be based on a mapping (e.g., table stored on memory 208) between road grade, duration to travel the road grade, and regenerative torque. For example, location of HEV 10 may be determined using location sensor/GPS receiver 230 along with a length of a current downhill grade being traversed by HEV 10. In some embodiments, road grade can be determined from known location/GPS information, or gravity sensor 232 along with calculated road load and vehicle speed based on sensor 214 can be used to determine, e.g., more accurate road grade. Based on the determined road grade and duration, a regenerative torque can be selected. Based on the selected regenerative torque, it can be determined whether or not regenerative torque can be added (without overcharging battery 44) or regenerative torque can be used to charge battery 44 as it coasts (e.g., if the battery SOC is insufficient to complete traversing the downhill grade without additional power).

At operation 704, a check may be performed to determine if charging power of battery 44 can be increased, and if so, whether engine 14 can be kept in an engine-off condition (e.g., EV travel mode). Whether or not charging power of battery 44 can be based on current operating characteristics of battery 44. For example, battery 44 may currently be in a state where additional charging power cannot be added without harming or damaging battery 44. For example, due to previous traffic, road grade, or other operating/road conditions, battery 44 may not be able to support increased charging power. However, increased charge power may be possible, while keeping engine 14 off, in which case, at operation 706, the charging power limit of battery 44 may be increased. As discussed above in conjunction with FIG. 6, increased charging power may allow for additional regenerative torque to be added to the drive power of HEV 10 to protect the pinion gears and associated hardware/componentry of HEV 10. Accordingly, the increased charging power may be considered when setting the amount of initial regenerative torque at operation 712.

If charging power cannot be increased, at operation 708, a check is performed to determine whether or not the battery SOC limit can be increased while keeping engine 14 off. Again, as described above with respect to FIG. 6, battery SOC can be increased in order to support increased regenerative torque being added to the drive power of HEV 10 so that the pinion relative speed can be reduced, thereby avoiding the need to turn engine 14 on. If the battery SOC cannot be increased (again, as noted above, due to current battery state or condition), the initial amount of regenerative torque can be set without considering the temporary battery SOC increase.

At operation 714, after the initial regenerative torque amount is set, the pinion speed may be checked. Again, various embodiments are directed to ensuring that the pinion gear does not reach or exceed the pinion gear speed limit. Engine-on limiting logic 208A may cause processor 206 to communicate with pinion speed sensor 228 via communications circuit 201 to retrieve current pinion speed data. It should also be understood that pinion speed may refer to pinion relative speed, described above. Accordingly, other sensors 234 capable of or configured to measure speeds of associated components, e.g., the speed of ring gear R0, the speed of rotation of carrier CA0, etc. may be queried to determine the relative speed of the pinion gear.

At operation 716, another check can be performed to determine whether the pinion speed is approaching the pinion speed limit (overspeed). Again, pinion speed sensor 228 and/or other sensors 234 may be queried to obtain now-current pinion/relative speed(s). It should be understood that engine-on limiting circuit 210 need not explicitly request a current speed. Rather, these sensors may periodically or a periodically transmit their respective sensor data to engine-on limiting circuit 210 to be evaluated. For example, this sensor data may be transmitted via communications circuit 201 and stored or buffered/cached in memory 208, which can be accessed by processor 206 executing engine-on limiting logic 208A and compared to a set overspeed value. If the pinion speed is not approaching the pinion speed limit, motor control component 272 may continue to generate/apply the current amount of regenerative torque. This process of checking pinion speed and continuing to generate regenerative torque may continue until the pinion speed begins to approach the pinion speed limit or the downhill grade is complete at 720.

Referring now to FIG. 7B if the pinion speed does begin to approach the pinion speed limit, a check is performed to determine if the regenerative torque being generated is approaching its limit at operation 722. Again, regenerative torque can be thought of or reflected as a calibrated curve based on recreating a desired level of deceleration (gravitational force equivalent) feeling for the driver while coasting. The limit can be set by the maximum amount of motor torque as set by the motor's specification/characteristics. In a regular use case scenario, engine pumping loss torque can be added to generate more overall deceleration torque to meet driver demand. Battery SOC and motor/battery temperatures can affect the total available motor torque to use in this control logic. If the amount of regenerative torque being generated is not approaching the regenerative torque limit, additional regenerative torque may continue to be generated and added to the drive power of HEV 10 at operation 724.

The aforementioned road grade to duration to regenerative torque mapping may be used to determine how much regenerative torque can be generated. As noted above, increased regenerative torque or negative torque can positively contribute to fuel efficiency by keeping motor 22 operative in EV mode.

It should be noted that generally, regenerative torque can be limited by the temperature of motor 22B, as motor 22B generally provides the regenerative torque/drive power in EV mode. That is, vehicle 10 may operate in EV mode, in part, by preventing engine 14 from turning and providing a torque balance for motor 22A to push against through the use of a one-way clutch. However, in some instances, a vehicle may operate in a dual motor EV mode, where both motors provide drive power through the use of a clutch device that enables motor 22A to also provide regenerative torque. Such a clutch can provide counter-torque in both positive and negative directions. Accordingly, in some embodiments, additional regenerative torque can be provided by motor 22A under certain conditions, including but not necessarily limited to the following: when motor 22B temperature increases to the point that the amount of regenerative torque that can be provided is limited; when motor 22B is at maximum capacity, and more regenerative torque is being requested as described in accordance with various embodiments herein; and/or vehicle speed and the amount of regenerative torque requests results in decreased efficiency in the operation of motor 22B if motor 22B were to solely provide regenerative torque (versus motor 22B and 22A providing the regenerative torque).

Thus, in some embodiments, the logic/methods described herein can be adapted such that as the temperature of one motor, e.g., motor 22B (the one providing regenerative torque by default), increases, a certain percentage of the regenerative torque to be generated is requested of motor 22A. That is, regenerative torque generation responsibility can, in some instances, be relegated to a second motor. In some embodiments the higher the temperature of motor 22B (or the closer the temperature of motor 22B gets to a motor over-temperature limit or threshold), the more regenerative torque motor 22A will be configured/requested to generate. In some embodiments, extra regenerative torque may be deferred to motor 22A (or a portion thereof, e.g., extra regenerative torque request plus some given amount to aid in reducing the load on motor 22B). In some embodiments, the efficiency of each motor may be considered, along with the gearing ratio between the motors in the planetary gear set. In some embodiments, it may be a combination of the aforementioned scenarios. It should be noted that in some embodiments, maps can be generated for each of the aforementioned scenarios or possible regenerative torque responsibility handoffs to another motor, such that appropriate amounts or percentages of regenerative torque to be generated by the second motor can be determined. In still other embodiments, such mappings can be overlaid with one another to determine an ideal motor-motor combination for overall efficiency.

If, however, the regenerative torque limit is being approached, a check is performed to determine if the battery SOC is approaching the maximum charge limit of battery 44 at operation 726. The maximum charge limit may be that charge, which exceed, negatively impacts battery performance, such as a reduction in charge capacity. If battery 44 is not approaching this maximum charge limit, the charge limit may be temporarily increased as described above with respect to FIG. 6. Temporarily increasing the charge limit allows additional regenerative to be generated which can then be used to charge battery 44, optimizing the recuperation of energy and keeping engine 14 off. It should be understood that this temporary increase in charge limit takes into account an "absolute" charge limit that, e.g., cannot be surpassed, even temporarily, as doing so would permanently harm battery 44 or cause battery 44 to fail.

If battery 44 is approaching the maximum charge limit, a check is performed to determine if the battery SOC is greater than a determined threshold amount at operation 730. If the battery SOC of battery 44 is not greater than the determined threshold, the battery SOC may be temporarily increased at operation 732 (as described above in conjunction with FIG. 6). However, as with the charge limit, this temporary increase may be calculated relative to an absolute maximum battery SOC that cannot be or should not be surpassed, even temporarily.

If the battery SOC is greater than the threshold, at operation 734, engine motoring may be enabled, i.e., engine 14 may be operated in a fuel cut mode to absorb any additional regenerated energy to prevent the engine-on condition from occurring. In some embodiments, friction brakes can be engaged at operation 736 vis-à-vis brake control component 276. Operating (in this case, dragging) the friction brakes of HEV 10 can slow down pinion speed. This may be useful when HEV 10 cannot temporarily increase battery operating conditions, and/or when other operating conditions are "full" or at maximum in electrified drive power mode.

At operation 738, regenerative torque addition may be held at its current level until the default or conventional engine-on logic initiates, and engine 14 is turned on at 740. This engine-on logic may reside in ECU 50 or engine control component 270. In some embodiments, the engine-on condition may be initiated by the driver of HEV 10, and/or the battery SOC is at its absolute maximum. In some embodiments, the amount of regenerative torque requested/calculated by engine-on limiting circuit 210 exceeds the regenerative capabilities of HEV 10, and/or some other request, such as the driver or passenger enabling some HVAC component, or other vehicle component requires engine 14 to be turned on in order to support the request.

Figure 8:
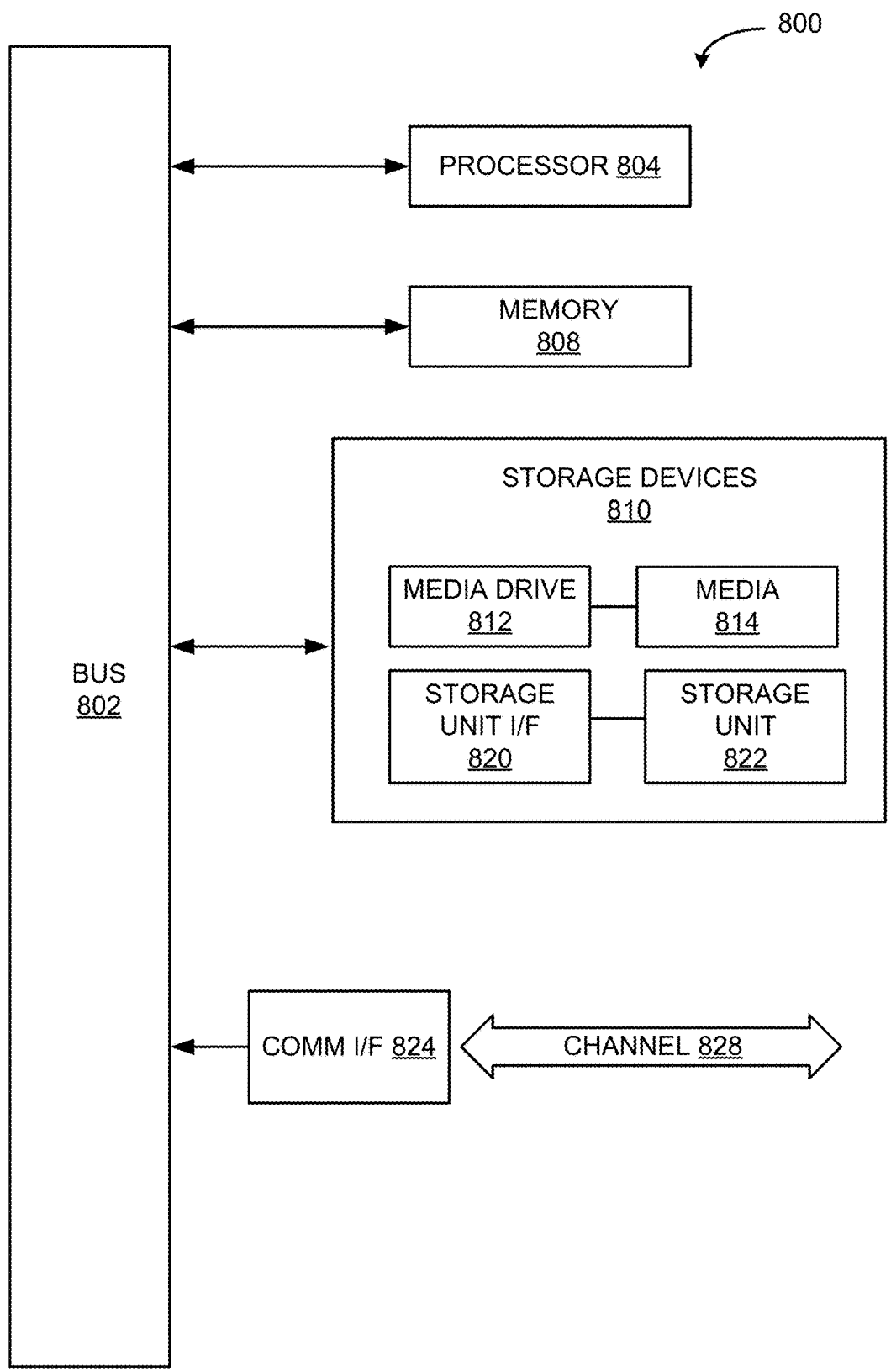
FIG. 8 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within computer processing units or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, electronic devices that might include some form of processing capability.

Computing component 800 might include, for example, one or more processors, controllers, control components, or other processing devices. This can include a processor, and/or any one or more of the components making up electronic control device 100 and/or its component parts, hydraulic control circuit 80, or other components or elements of vehicle, e.g., signal sensors, etc. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   determining a hybrid electric vehicle (HEV) is experiencing a coast condition;
   setting an initial amount of regenerative torque to be generated by a motor of the HEV;
   determining whether a pinion gear of the HEV is approaching a pinion gear overspeed limit;
   in response to a determination that the pinion gear of the HEV is not approaching the pinion gear overspeed limit, generating the initial amount of regenerative torque and applying the initial regenerative torque amount to drive the HEV while maintaining the HEV in an engine-off condition.

2. The method of claim 1, wherein the HEV is experiencing a coasting condition while traversing a downhill grade.

3. The method of claim 2, further comprising calculating a state of charge of a battery powering the HEV required to complete traversal of the downhill grade.

4. The method of claim 3, further comprising determining if charge power of the battery can be increased while maintaining the HEV in an engine-off condition, and if so, increasing a charge power limit of the battery to accommodate regenerated energy produced by application of the initial amount of regenerative torque.

5. The method of claim 4, further comprising determining if a state of charge limit of the battery can be increased while maintaining the HEV in an engine-off condition, and if so, increasing the state of charge limit to accommodate the regenerated energy produced by application of the initial amount of regenerative torque.

6. The method of claim 1, further comprising, in response to a determination that the pinion gear of the HEV is approaching the pinion gear overspeed limit, determining whether the initial amount of regenerative torque is approaching a regenerative torque threshold.

7. The method of claim 6, further comprising, in response to a determination that the initial amount of regenerative torque is not approaching the regenerative torque threshold, generating an additional amount of regenerative torque and applying the additional amount of regenerative torque to drive the HEV while maintaining the HEV in an engine-off condition.

8. The method of claim 6, further comprising, in response to a determination that the initial amount of regenerative torque is approaching the regenerative torque threshold, determining whether the battery charge limit has reached a maximum level.

9. The method of claim 8, further comprising, in response to determining that the battery has not reached the maximum level, temporarily increasing the charge limit above the maximum level but below an absolute maximum level.

10. The method of claim 8, further comprising, in response to determining that the battery has reached the maximum level, operating an engine of the HEV in a fuel cut off condition.

11. The method of claim 10, further comprising, engaging friction bakes of the HEV.

12. The method of claim 10, further comprising, continuing application of the initial amount of regenerative torque until operating conditions of the HEV necessitate an engine-on condition, and instructing the engine of the HEV to turn on.

\* \* \* \* \*